US009406309B2

(12) United States Patent
Ruwisch

(10) Patent No.: US 9,406,309 B2
(45) Date of Patent: Aug. 2, 2016

(54) METHOD AND AN APPARATUS FOR GENERATING A NOISE REDUCED AUDIO SIGNAL

(76) Inventor: Dietmar Ruwisch, Berlin (DE)

( * ) Notice: Subject to any disclaimer, the term of this patent is extended or adjusted under 35 U.S.C. 154(b) by 993 days.

(21) Appl. No.: 13/618,234

(22) Filed: Sep. 14, 2012

(65) Prior Publication Data

US 2013/0117016 A1 May 9, 2013

Related U.S. Application Data

(60) Provisional application No. 61/556,431, filed on Nov. 7, 2011.

(51) Int. Cl.
*H04B 15/00* (2006.01)
*G10L 21/02* (2013.01)
*G10L 21/0208* (2013.01)

(52) U.S. Cl.
CPC .................................. *G10L 21/0208* (2013.01)

(58) Field of Classification Search
CPC .................................................. G10L 21/0208
USPC .......................................... 704/225, E21.002
See application file for complete search history.

(56) References Cited

U.S. PATENT DOCUMENTS

| | | | | |
|---|---|---|---|---|
| 4,887,299 | A * | 12/1989 | Cummins ............ | H04R 25/356 381/106 |
| 6,757,395 | B1 * | 6/2004 | Fang .................. | G10L 21/0208 381/94.3 |
| 6,820,053 | B1 | 11/2004 | Ruwisch | |
| 7,327,852 | B2 | 2/2008 | Ruwisch | |
| 7,908,134 | B1 * | 3/2011 | Felber ...................... | H03G 3/32 704/205 |
| 2003/0156723 | A1 | 8/2003 | Ruwisch | |
| 2003/0179888 | A1 | 9/2003 | Burnett et al. | |
| 2005/0063558 | A1 * | 3/2005 | Neumann ........... | G10L 21/0208 381/317 |
| 2007/0071253 | A1 * | 3/2007 | Sato .................... | G10L 21/0208 381/94.3 |
| 2007/0263847 | A1 | 11/2007 | Konchitsky | |
| 2009/0299742 | A1 * | 12/2009 | Toman ................ | G10L 21/0272 704/233 |
| 2011/0135107 | A1 * | 6/2011 | Konchitsky ............ | H04R 1/406 381/71.11 |
| 2011/0200206 | A1 | 8/2011 | Ruwisch | |
| 2011/0257967 | A1 | 10/2011 | Every et al. | |
| 2012/0197638 | A1 * | 8/2012 | Li ....................... | G10L 21/0208 704/226 |
| 2013/0191119 | A1 * | 7/2013 | Sugiyama ................ | H04B 3/23 704/226 |

FOREIGN PATENT DOCUMENTS

| | | |
|---|---|---|
| DE | 199 48 308 | 4/2001 |
| DE | 10043064 | 3/2002 |
| DE | 102004005998 | 5/2005 |
| DE | 102010001935 | 1/2012 |
| WO | 03/043374 | 5/2003 |
| WO | 2006/041735 | 4/2006 |

OTHER PUBLICATIONS

European Search Report corresponding to EP 11 19 2738 mailed Nov. 6, 2012, 6 pages.

* cited by examiner

*Primary Examiner* — Oluwadamilola M Ogunbiyi
(74) *Attorney, Agent, or Firm* — Harrity & Harrity, LLP

(57) ABSTRACT

A method and apparatus are provided for generating a noise reduced output signal from sound received by a first microphone. The method includes transforming the sound received by the first microphone into a first input signal and transforming sound received by a second microphone into a second input signal. The method includes calculating, for each of a plurality of frequency components, an energy transfer function value as a real-valued quotient by dividing a temporally averaged product of an amplitude of the first input signal and the second input signal by a temporally averaged absolute square of the second input signal, calculating a gain value as a function of the calculated energy transfer function value, and generating the noise reduced output signal based on the product of the first input signal and the calculated gain value at each of the plurality of frequency components.

21 Claims, 4 Drawing Sheets

METHOD AND AN APPARATUS FOR GENERATING A NOISE REDUCED AUDIO SIGNAL

RELATED APPLICATION

This application is based upon and claims the benefit of priority from U.S. Provisional Patent Application No. 61/556, 431, filed on Nov. 7, 2011, the disclosure of which is incorporated herein in its entirety by reference.

FIELD OF INVENTION

The present invention generally relates to methods and apparatus for generating a noise reduced audio signal from sound received by communications apparatus. More particular, the present invention relates to ambient noise-reduction techniques for communications apparatus such as telephone handsets, especially mobile or cellular phones, walkie-talkies, hands-free phone sets, or the like. In the context of the present invention, "noise" and "ambient noise" shall have the meaning of any disturbance added to a desired sound signal like a voice signal of a certain user, such disturbance can be noise in the literal sense, and also interfering voice of other speakers, or sound coming from loudspeakers, or any other sources of sound, not considered as the desired sound signal. "Noise Reduction" in the context of the present invention shall also have the meaning of focusing sound reception to a certain area or direction, e.g. the direction to a user's mouth, or more generally, to the sound signal source of interest.

BACKGROUND OF THE INVENTION

Telephone handsets, especially mobile phones, are often operated in noise polluted environments. Microphone(s) of the handset being designed to pick up the user's voice signal unavoidably pick up environmental noise, which leads to a degradation of communication comfort. Several methods are known to improve communication quality in such use cases. Normally, communication quality is improved by attempting to reduce the noise level without distorting the voice signal. There are methods that reduce the noise level of the microphone signal by means of assumptions about the nature of the noise, e.g. continuity in time. Such single-microphone methods as disclosed, e.g., in German patent DE 199 48 308 C2 achieve a considerable level of noise reduction. However, the voice quality degrades if there is a high noise level, and a high noise suppression level is applied.

Other methods use an additional microphone for further improvement of the communication quality. Different geometries can be distinguished, which are addressed as methods with "symmetric microphones" or "asymmetric microphones". Symmetric microphones usually have a spacing as small as 1-2 cm between the microphones, where both microphones pick up the voice signal in a rather similar manner and there is no principle distinction between the microphones. Such methods as disclosed, e.g., in German patent DE 10 2004 005 998 B3 require information about the expected sound source location, i.e. the position of the user's mouth relative to the microphones, since geometric assumptions are the basis of such methods.

Further developments are capable of in-system adaptation, wherein the algorithm applied is able to cope with different and a-priori unknown positions of the sound source. However, such adaption requires noise-free situations to "calibrate" the system as disclosed, e.g. in German patent application DE 10 2010 001 935 A1.

"Asymmetric microphones" typically have greater distances of around 10 cm, and they are positioned in a way that the level of voice pick-up is as distinct as possible, i.e. one microphone faces the user's mouth, the other one is placed as far away as possible from the user's mouth, e.g. at the top edge or back side of a telephone handset. The goal of the asymmetric geometry is a difference of preferably approximately 10 dB in the voice signal level between the microphones. The simplest method of this kind just subtracts the signal of the "noise microphone" (away from user's mouth) from the "voice microphone" (near user's mouth), taking into account the distance if the microphones. However since the noise is not exactly the same in both microphones and its impact direction is usually unknown, the effect of such a simple approach is poor.

More advanced methods try to estimate the time difference between signal components in both microphone signals by detecting certain features in the microphone signals in order to achieve a better noise reduction results, cf. e.g., WO 2003/043374 A1. However, feature detection can get very difficult under certain conditions, e.g. if there is a high reverberation level. Removing such reverberation is another aspect of 2-microphone methods as disclosed, e.g., in WO2006/041735 A2, in which spectra-temporal signal processing is applied.

Therefore, none of the methods or systems known in the art allow robust improvement of the communication quality for a wide range of ambient noise conditions.

SUMMARY OF THE INVENTION

It is therefore an object of the present invention to provide improved and robust noise reduction methods and apparatus processing signals of at least two microphones using asymmetric techniques and, with applied pre-processing, also symmetric techniques.

The invention, according to a first aspect, provides a method and an apparatus for generating a noise reduced output signal from sound received by a first microphone. The method includes transforming the sound received by the first microphone into a first input signal, where the first input signal is a frequency domain signal of an analog-to-digital converted audio signal corresponding to the sound received by the first microphone and transforming sound received by a second microphone, the second microphone being spaced apart from the first microphone, into a second input signal, where the second input signal is a frequency domain signal of an analog-to-digital converted audio signal corresponding to the sound received by the second microphone. The method also includes calculating, for each of a plurality of frequency components, an energy transfer function value as a real-valued quotient by dividing a temporally averaged product of an amplitude of the first input signal and the second input signal by a temporally averaged absolute square of the second input signal, where the temporal averaging of the product and the temporal averaging of the absolute square are subject to a first update condition. The method further includes calculating, for each of the plurality of frequency components, a gain value as a function of the calculated energy transfer function value, and generating the noise reduced output signal based on the product of the first input signal and the calculated gain value at each of the plurality of frequency components.

The apparatus includes a first microphone to transform sound received by the first microphone into a first input signal, where the first input signal is a frequency domain signal of an analog-to-digital converted audio signal corresponding to the sound received by the first microphone and a second microphone to transform sound received by the second microphone, the second microphone being spaced apart from the first microphone, into a second input signal, where the second input signal is a frequency domain signal of an analog-to-digital converted audio signal corresponding to the sound received by the second microphone. The apparatus also includes a processor to calculate, for each frequency component, an energy transfer function value as a real-valued quotient obtained by dividing a temporally averaged product of an amplitude of the first input signal and an amplitude of the second input signal by a temporally averaged absolute square of the second input signal, where the temporal averaging of the product of the amplitude of the first input signal and the amplitude of the second input signal and the temporal averaging of the absolute square of the second input signal is subject to a first update condition, a gain value which is a function of the calculated energy transfer function value, and a noise reduced output signal based on a product of the first input signal and the calculated gain value at each frequency component.

In this manner an apparatus for carrying out an embodiment of the invention can be implemented.

It is an advantage of the present invention that it provides a very stable two-microphone noise-reduction technique, because it avoids detection of complicated features, which can fail under certain conditions, e.g. reverberation, etc.

According to an embodiment, in the method according to an aspect of the invention, the temporal averaging of the product and the temporal averaging of the absolute square are updated for each frequency component, of the plurality of frequency components, when the second input signal has a higher signal level than the first input signal, or the temporal averaging of the product and the temporal averaging of the absolute square are updated for at least one frequency component, of the plurality of frequency components, when the second input signal has a higher signal level than the first input signal for the at least one frequency component.

In this manner short time signal fluctuation for all or only for one or more signal components can be avoided by maintaining the correlation of the noise signals both in the first and second input signals.

According to an embodiment, in the method according to an aspect of the invention, the gain value is calculated, for each of the plurality of frequency components, as a monotonously falling function, and the monotonously falling function includes an argument based on the energy transfer function value multiplied by an absolute spectral amplitude value of the second input signal divided by an absolute spectral amplitude value of the first input signal.

The gain value forms an attenuation filter determining the attenuation of the noise reduction in the output signal.

According to an embodiment, in the method according to an aspect of the invention, the gain value is calculated, for each of the plurality of frequency components, in a way that the gain value does not exceed 1 and the gain value is set to a predetermined minimal value if the calculated gain value is smaller than the predetermined minimal value.

In this manner the gain value is defined as an attenuation of the first input signal which is limited to the predetermined minimal value.

According to an embodiment, in the method according to an aspect of the invention, generating the noise reduced output signal comprises transforming the product at all frequency components into a discrete time domain noise reduced output signal.

In this manner a noise reduced output signal in the time domain is generated which then can be further processed, or send to a communication channel, or output to a loudspeaker, or the like.

According to an embodiment, the method further comprises generating a pre-processed first input signal by subtracting a pseudo noise signal based on the second input signal from the first input signal before calculating the energy transfer function value, and substituting the first input signal with the pre-processed first input signal when calculating the energy transfer function value, calculating the gain value, and generating the noise reduced output signal.

In this manner a preprocessing of the first input signal to further reduce the noise in the voice signal is provided.

According to an embodiment, in the method according to an aspect of the invention, the method also comprises calculating, for each frequency component, a noise amplitude transfer function value as a complex-valued quotient obtained by dividing a temporally averaged product of the first input signal and a complex conjugate of the second input signal by the temporally averaged absolute square of the second input signal, where the temporal averaging of the product of the first input signal and the complex conjugate and the temporal averaging of the absolute square of the second input signal are subject to a second update condition. The method further comprises calculating the pseudo noise signal based on the second input signal and the calculated noise amplitude transfer function and calculating the pre-processed first input signal by subtracting the calculated pseudo noise signal from the first input signal, where the temporal averaging of the absolute square of the second update condition is updated for each frequency component, of the plurality of frequency components when the second input signal has a higher signal level than the first input signal, or the temporal averaging of the absolute square of the second update condition is updated for at least one frequency component, of the plurality of frequency components when the second input signal has a higher signal level than the first input signal for the at least one frequency component.

In this manner a linear preprocessing of the first input signal is achieved with the advantage of providing a further noise reduction without almost any degradation of the voice signal quality in the preprocessed first input signal.

According to an embodiment, in the method according to an aspect of the invention, the pseudo noise signal is calculated by a discrete convolution of a time domain signal of the second input signal with a noise response function transformed from the calculated complex-valued noise amplitude transfer function into a time domain.

According to another embodiment, in the method according to an aspect of the invention, the above step is carried out in the frequency domain, and the noise amplitude transfer function is multiplied, component by component, with the frequency spectrum of the second input signal resulting in a pseudo noise frequency spectrum.

In this manner the pseudo noise signal is provided as linear assumption of the noise level in the first input signal which can then be subtracted either in the time domain or in the frequency domain from the first input signal to generate the preprocessed first input signal.

According to another embodiment, the method further comprises generating a pre-processed second input signal by subtracting a pseudo voice signal based on the first input signal from the second input signal before generating the pre-processed first input signal and substituting the second input signal with the pre-processed second input signal when calculating the energy transfer function value, calculating the gain value, and generating the noise reduced output signal.

In this manner a signal processing step is introduced which is capable of reducing the voice signal level in the second input signal with the advantage that the methods of the invention could even be applied in situation in which the first input signal does not always has the higher voice signal level compared to the second input signal.

According to an embodiment, the method also comprises calculating, for each frequency component of the plurality of frequency components, a voice amplitude transfer function value as a complex-valued quotient obtained by dividing a temporally averaged product of the second input signal and a complex conjugate of the first input signal by a temporally averaged absolute square of the first input signal, where the temporal averaging of the product of the second input signal and the temporal averaging of the averaged absolute square of the first input signal is subject to a third update condition. The method further comprises calculating the pseudo voice signal based on the input signal and the calculated voice amplitude transfer function and calculating the pre-processed second input signal by subtracting the calculated pseudo voice signal from the second input signal, where the temporal averaging with the third update condition is updated for each frequency component, of the plurality of frequency components, when the first input signal has a higher signal level than the second input signal, or the temporal averaging with the third update condition is updated for at least one frequency component, of the plurality of frequency components, when the first input signal has a higher signal level than the second input signal for the at least one frequency component.

In this manner a linear preprocessing of the second input signal to reduce the voice signal level in the noise signal of the second microphone is achieved.

According to an embodiment, in the method according to an aspect of the invention, the pseudo voice signal is calculated by discrete convolution of a time domain signal of the first input signal with a voice response function transformed from the calculated voice amplitude transfer function into a time domain.

According to another embodiment, in the method according to an aspect of the invention, generating the pre-processed second input signal is carried out in the frequency domain, and the voice transfer function is multiplied with the frequency spectrum of the first input signal yielding a pseudo voice frequency spectrum.

In this manner the pseudo voice signal is provided as linear assumption of the voice level in the second input signal which can then be subtracted from the second input signal to generate the preprocessed second input signal either in the time domain or in the frequency domain. The voice signal level reduction in the noise signal of the second microphone thus is to a certain extend the opposite operation to the noise signal level reduction in the voice signal of the first microphone.

Still other objects, aspects and embodiments of the present invention will become apparent to those skilled in the art from the following description wherein embodiments of the invention will be described in greater detail.

BRIEF DESCRIPTION OF THE DRAWINGS

The invention will be readily understood from the following detailed description in conjunction with the accompanying drawings. As it will be realized, the invention is capable of other embodiments, and its several details are capable of modifications in various, obvious aspects all without departing from the invention. Accordingly, the drawings and descriptions will be regarded as illustrative in nature and not as restrictive. In the drawings.

DETAILED DESCRIPTION

In the following embodiments of the invention will be described. First of all, however, some terms will be defined and reference symbols are introduced.

m Number of time-domain signal samples forming a block to be transformed into the frequency domain n(t) Time domain signal of Noise microphone (time discrete, digital signal)

v(t) Time domain signal of Voice microphone w(t) Time domain voice signal after first step of noise reduction u(t) Time domain voice signal after second step of noise reduction W(f) Frequency domain signal of first-step noise-reduced voice signal (complex valued spectral amplitude)

U(f) Frequency domain signal of second-step noise-reduced voice signal

V(f) Frequency domain signal of Voice microphone signal

N(f) Frequency domain signal of Noise microphone signal

N*(f) conjugate complex of N(f)

$|N(f)|^2=N(f)\,N^*(f)$, absolute square of N(f)

$\overline{X}$ Computational result of exponential smoothing of variable X: $\overline{X}_{NEW}=\beta\overline{X}_{OLD}+(1-\beta)X$ under certain threshold conditions β Decay parameter of exponential smoothing, $0<\beta<1$ H(f) Complex-valued Noise Amplitude Transfer Function h(t) Noise Response Function calculated by means of Inverse Fourier Transformation of H(f)

p(t) Pseudo-Noise signal, assumption of noise portion in Voice microphone

G(f) Real-valued Energy Transfer Function of second step of noise reduction $\theta_N$ Threshold parameters α Tunable noise reduction level parameter >0

C Tunable limitation of noise reduction parameter >0

A(f) Attenuation filter coefficients of second step of noise reduction k Coefficient (exponent) in the calculation of A(f)

O(f) Complex valued Voice Amplitude Transfer Function o(t) Voice Amplitude Response Function μ(t) Pseudo voice signal, assumption of voice portion in Noise microphone η(t) Voice-reduced Noise microphone time domain signal.

Figure 1:
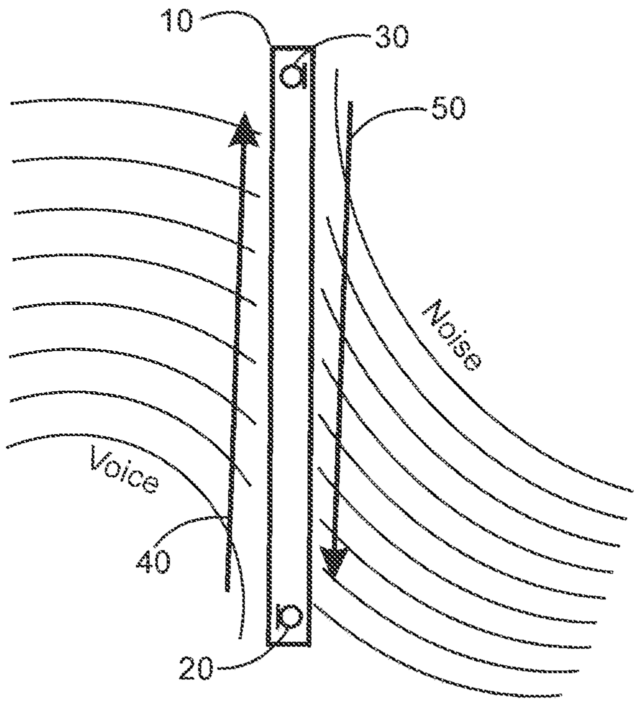
FIG. 1 schematically shows a side view of an apparatus according to an embodiment of the present invention.

FIG. 1 illustrates a side view of a telephone handset 10 (in the following also just handset) according to an embodiment with the front side left and the back side right and a first microphone 20 and a second microphone 30. The microphones are arranged such that the first microphone 20, also referred to as Voice microphone, is adapted to receive sound comprising the voice of the user wherein the second microphone 30, also referred to as Noise microphone, is adapted to receive sound comprising ambient noise. For example, such an arrangement is achieved by positioning the voice microphone such in the handset that it is close to the user's mouth (not shown) when the handset is in normal operation. The noise microphone is preferably positioned at an opposite end or far side of the handset receiving as little (direct) voice of the user as possible. In an embodiment the voice microphone is positioned at the lower front side of the handset and the noise microphone at its upper back side. As in normal use of such a handset the user would then place the handset when making a call such that the front side is positioned towards the user with the user's mouth relatively close or at least in proximity to the voice microphone and the noise microphone directed away from the user. The transition of the sound of user's voice in normal use is highly schematically and simplified shown by arrow 40 and the "Voice" lines illustrating the sound waves of the voice. The transition of the ambient noise at the back side of the handset is highly schematically and simplified shown by arrow 50 and the "Noise" lines illustrating the sound waves of the noise at the back side. According to another embodiment, the principles of the present invention can also be implemented in an apparatus comprising, e.g., a hands-free phone set or the like by using directional pattern characteristics of the first and second microphones so that even if the voice microphone is not positioned closed or at least in proximity to the user's mouth methods according to embodiments can be applied as it will be described in more detail below.

Embodiments of the present invention enable to reduce the signal level of the ambient noise being present in the Voice microphone with the help of the information provided by the Noise microphone. It is a reasonable assumption that both microphones will receive similar noise from the ambience, but not identical noise signals. In order to cope with this situation, there is provided a method that is capable of modeling the difference between the noise in the Voice microphone and in the Noise microphone, or, in other words, the transition of noise from the Noise microphone to the Voice microphone, so the ambient noise level in the Voice microphone can be most efficiently reduced, with no or only minimal effects on the voice signal component of the Voice microphone. Said Noise transition is modeled according to embodiments of the present invention by so-called transfer functions H(f) and G(f) with complex-valued or real-valued components, respectively, for each frequency f. Moreover, also a voice transfer function modeling the transition of the voice signal from the Voice microphone to the Noise microphone according to an embodiment is described. The calculation of the transfer functions according to further embodiments is further described.

Figure 2:
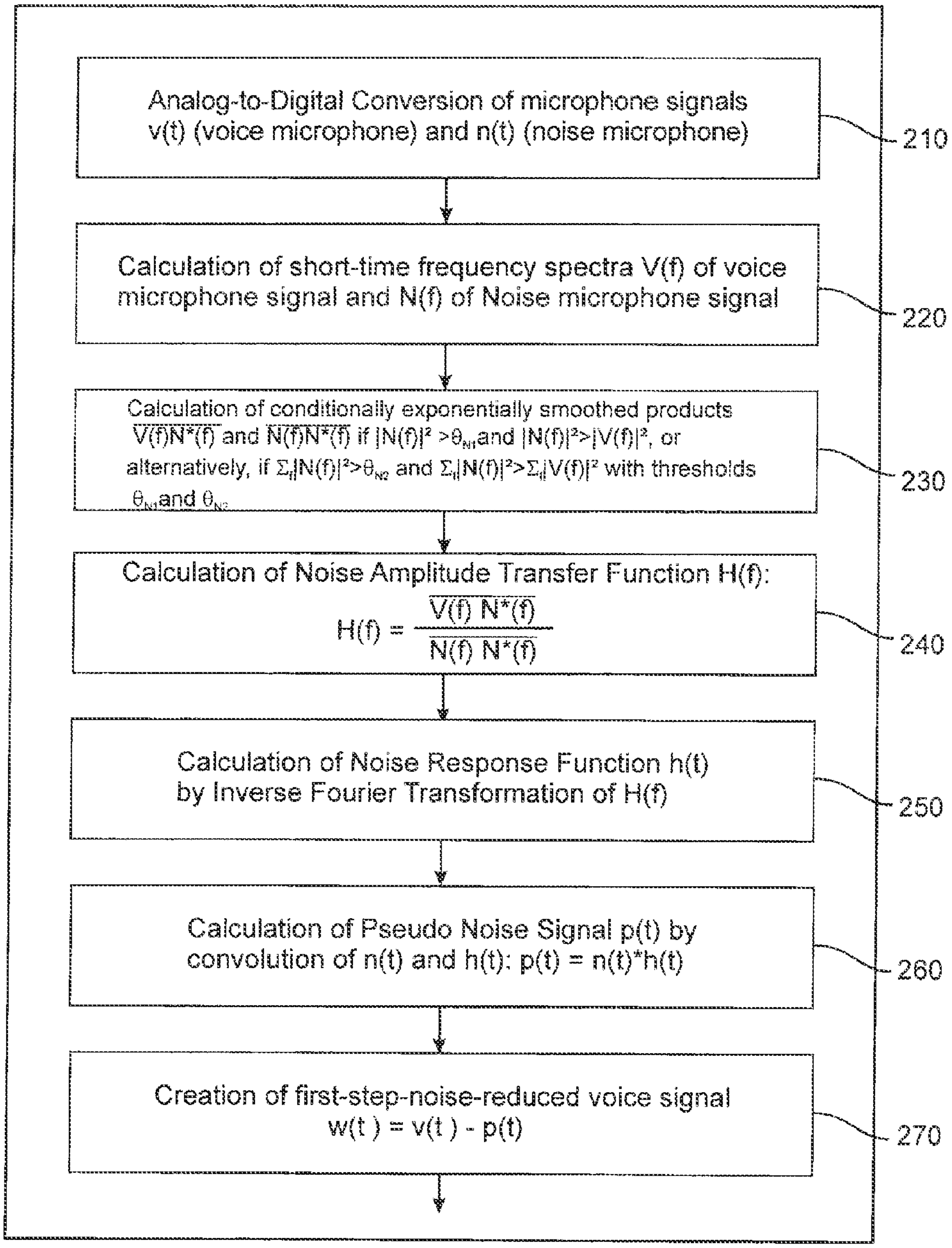
FIG. 2 shows a flow diagram illustrating a method according to an embodiment of the present invention creating a noise reduced voice signal according to a first aspect.

FIG. 2 shows a flow diagram of noise reduced output signal generation from sound received by the voice microphone according to a first aspect of the invention. Both voice microphone and noise microphone time-domain signals are converted into time discrete digital signals v(t) and n(t), respectively (step 210). Blocks of m (e.g. m=256) signal samples of both microphone signals are, after appropriate windowing (e.g. Hann Window), transformed into frequency domain signals V(f) and N(f) to generate first and second input signals, respectively, using a transformation method known in the art (e.g. Fast Fourier Transform) (step 220). V(f) and N(f) are addressed as complex-valued frequency domain signals with m/2 independent components distinguished by the frequency f. For N(f) the Complex Conjugate N*(f) is calculated and multiplied with V(f) as well as N(f), respectively. Multiplication of frequency domain signals is defined in a way that each component of N*(f) is multiplied with the f-identical component of V(f) and N(f), respectively. If a certain number (e.g. m/2) of new samples of the time domain signals v(t) and n(t) is available, new frequency domain signals are calculated from a new block of the most recent m time domain signal samples. Above described products of frequency domain signals undergo conditional exponential smoothing with a decay parameter β, 0<β<1 in step 230.

Exponential smoothing is defined according to an embodiment as follows: Let $\overline{X}$ denote the computational result of exponential smoothing, which is carried out for every single component of said products as $\overline{X}_{NEW}=\beta\overline{X}_{OLD}+(1-\beta)X$, whereas the index NEW indicates the updated-, and the index OLD denotes the previous result of the exponentially smoothed component, and X denotes the component with frequency f of the respective product.

It will be appreciated that exponential smoothing is a preferred implementation, however, any other temporal averaging process is usable as well. By means of temporal averaging, short time signal fluctuations disappear and the correlation of the different noise signals in both Voice and Noise microphones remain. Smoothing or averaging should be updated only if sufficient ambient noise is present, otherwise there is no information present that could be used for the calculation of the transfer function. Therefore a threshold is defined, with usable ambient noise being above said threshold, but systems noise created e.g. by the amplifiers is below threshold. The latter noise is not noise in the sense of the invention, which could be reduced by the method according to an embodiment.

Furthermore, it is important to make sure that preferably only ambient noise and no user's voice signals enter the calculation process of the noise transfer functions. Such voice signal would distort the wanted transfer function. If the user speaks, the voice microphone level will be higher than the noise microphone level, because the voice microphone is usually closer to the speaker's mouth. This information is used to pause the update of the averaging process during the user is speaking. In other words, exponential smoothing is conditional; with the condition that an update is carried out only if sufficient noise is present, but preferably no voice. The noise condition is deemed to be true if the signal energy of the noise microphone is above a given threshold. The voice condition makes use of the fact that there is a higher voice signal in the voice microphone than in the noise microphone: If there is voice, the energy of the Voice microphone is above that of the noise microphone. Exponential smoothing can preferably be applied in two alternative ways: either separately for each frequency component or for the total signal energies of the of voice and noise microphone signals. In more detail, according to an embodiment, exponential smoothing is updated for a component with frequency f only if $|N(f)|^2>\theta_{N1}$ and if $|N(f)|^2>|V(f)|^2$, or alternatively, if $\Sigma_f|N(f)^2>\theta_{N2}$ and if $\Sigma_f|N(f)|^2>\Sigma_f|V(f)|^2$; where $\theta_{N1}$ and $\theta_{N2}$ are threshold parameters for the alternative conditions of conditional exponential smoothing, and $\Sigma_f$ is the sum operator over all signal components with frequencies f, forming the total energy of each signal used in said second alternative.

In step 240, conditionally exponentially smoothed products V(f)N*(f) and N(f)N*(f) are then divided, yielding the Noise Amplitude Transfer Function H(f) according to the first aspect, with the definitions from above:

$$H(f)=\frac{\overline{V(f)N*(f)}}{\overline{N(f)N*(f)}}.$$

The noise amplitude transfer function H(f) describes in the frequency domain the phase-linear transition of noise signals from the noise microphone to the voice microphone according to an embodiment.

So calculated Noise Amplitude Transfer Function H(f) is then inversely transformed into the time domain in step 250, yielding a Noise Response Function h(t), which can be understood as a filter that applied by the space between voice and noise microphone altering the noise signal on its way from the noise to the voice microphone. Accordingly, discrete convolution of the time domain signal of the noise microphone n(t) with h(t) in step 260 yields a pseudo noise signal $p(t)=n(t)*h(t)$, which is a linear assumption of the noise level in the voice microphone. Subtracting p(t) from v(t) in step 270 yields a first-step noise-reduced voice signal $w(t)=v(t)-p(t)$. The noise reduction method according to the first aspect has the advantage that it is capable of reducing noise without almost any degradation of the voice quality or adding artifacts to the voice signal. However, it will be appreciated that success or effect of the described method according to the first aspect is limited to localized noise sources moving not too fast. Diffuse sound fields of noise or noise from fast alternating sources, however, cannot be sufficiently reduced well with the so far described linear method according to the first aspect.

Figure 3:
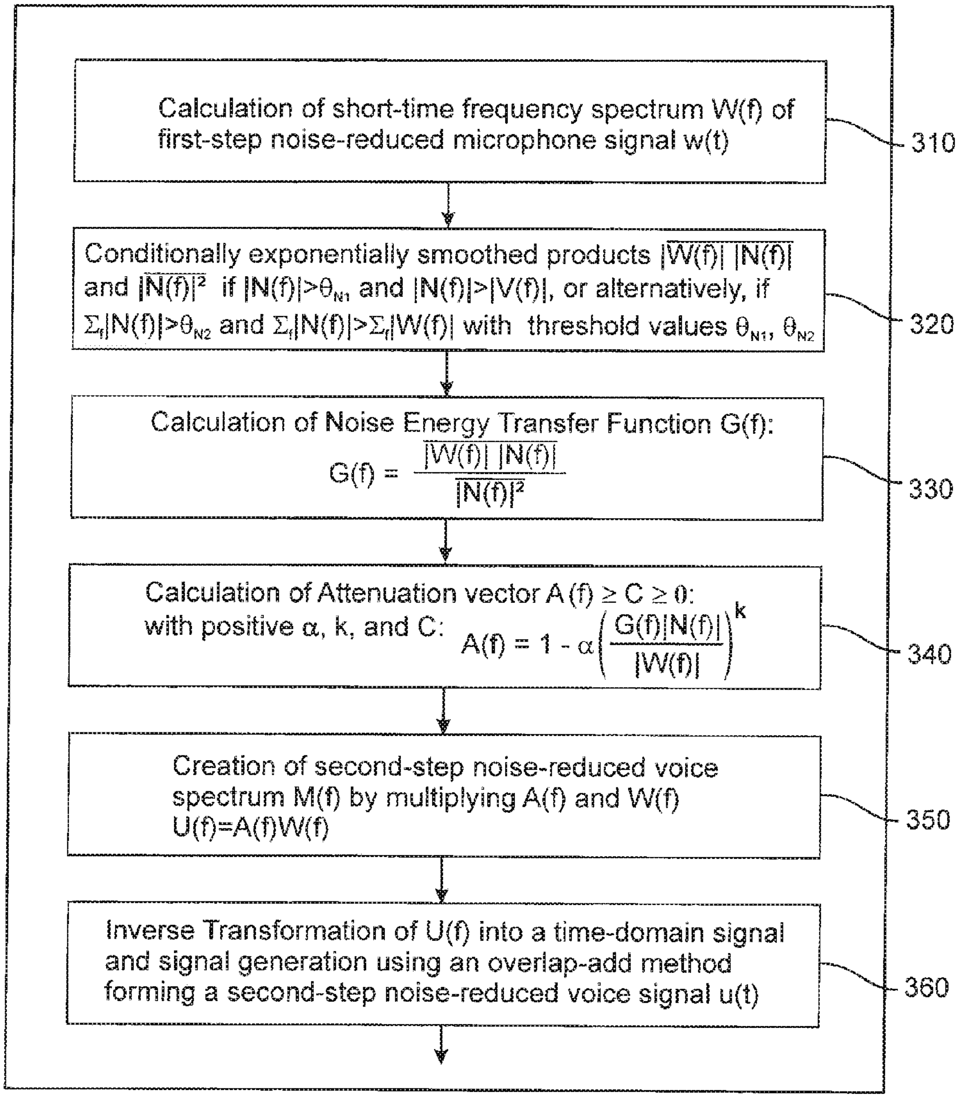
FIG. 3 shows a flow diagram illustrating a method according to an embodiment of the present invention creating a noise reduced voice signal according to a second aspect.

FIG. 3 shows a flow diagram of noise reduced output signal generation from sound received by the voice microphone according to a second aspect of the invention. It will be appreciated that in order to achieve a desired level of noise reduction for a wider range of noise situations, including noise from faster alternating sources, a non-linear method of noise reduction according to the second aspect is provided.

It will be further appreciated that this method according to the second aspect can be operated on the input signals from the first and second microphones as well as on the linearly noise-reduced voice signal w(t) as noise reduced output signal generated according to an embodiment of the first aspect method.

According to embodiments of the second aspect, a second transfer function called Energy Transfer Function G(f) is calculated. Where the Amplitude Transfer Function H(f) according to the first aspect is complex valued and could be interpreted as a filter function generation a pseudo noise signal, the Energy Transfer Function G(f) according to the second aspect is real valued and models the noise energy ratio between Noise and Voice microphone in each frequency component f.

The flow diagram in FIG. 3 illustrates a second aspect method according to an embodiment in which the linearly noise-reduced voice signal w(t) as noise reduced output signal generated according to an embodiment of the first aspect method is further processed in step 310 by calculating a short-time frequency spectrum W(f) of w(t). In step 320, products of frequency domain signals W(f) and N(f) undergo conditional exponential smoothing as already explained above with respect to the first aspect.

It will be appreciated that the threshold assumptions and signal conditions explained for the Amplitude Transfer Function H(f) also hold for the calculation of the Energy Transfer Function G(f), and basically the same remarks on the smoothing or temporal averaging process apply. Like the voice microphone signal v(t) before, blocks of m samples of w(t) are transformed into a frequency domain signal W(f) in step 310, e.g. by means of Fast Fourier Transform, with suitable windowing. Similar to embodiments of the first aspect, also in the embodiments of the second aspect a quotient of conditionally smoothed products is calculated in step 330, however, in contrast to the linear processing of the first aspect with complex amplitudes, in the embodiments according to the second aspect it is relied on real valued energy quotients, introducing a real valued Energy Transfer Function G:

$$G(f)=\frac{\overline{|W(f)||N(f)|}}{\overline{|N(f)|^2}}$$

Like in the embodiments according to the first aspect, both enumerator and denominator products of G(f) are conditionally exponentially smoothed in step 320, where the exponential smoothing is updated only if the noise signal level is above a threshold, and the signal energy of the noise microphone is above the signal energy in the voice microphone. This condition applies either for the energy levels of each spectral component, or for the energy levels of the signals as a whole. Thus like before, exponential smoothing is only updated for a component with frequency f if $|N(f)|^2>\theta_{N1}$, and if $|N(f)|^2>|V(f)|^2$, or alternatively, if said conditions are true for the sums over all f-components instead for each single component, i.e. if $\Sigma_f|N(f)|^2>\theta_{N2}$ and $\Sigma_f|N(f)|^2>\Sigma_f|V(f)|^2$.

According to an embodiment, in step 340 for each spectral component an attenuation value is computed, forming an attenuation filter. According to an embodiment, the attenuation or gain value can be described with the formula:

$$A(f)=1-\alpha\left(\frac{G(f)|N(f)|}{|W(f)|}\right)^k$$

with positive constants α and k. It will be appreciated that the exponent is chosen as k=2, and α can be seen as a parameter that controls the strength of noise reduction in this second step, with typical values between 1 and 4. According to an embodiment, if the computational result of A(f) is smaller than a minimal value C, A(f) is set to C. In other words, A(f) is not allowed to become smaller than C, which limits the maximum attenuation of noise reduction in this second step, and is preferably set to a value of, e.g., −30 dB.

In step 350, A(f) is then multiplied component by component with the first-step noise reduced spectrum W(f), forming the spectrum of the second-step noise reduced microphone signal $U(f)=A(f)W(f)$. In step 360, U(f) is inversely transformed into the time domain using standard synthesis techniques, Inverse Fourier Transform and an overlap-add method, generating the noise reduced voice signal u(t) as noise reduced output signal according an embodiment of the second aspect method.

It will be appreciated that the second aspect processing is non-linear and more aggressive than the linear first step, and the level of noise reduction can be controlled by means of parameters α and C. Also in situations where the first aspect processing does not achieve sufficient noise reduction, the second aspect processing is still effective. However, due to its non-linear nature, the second aspect processing can introduce artifacts to the voice signal, whereas the first aspect linear processing is almost free of unwanted artifacts.

According to an embodiment, and e.g. if computational resources are short, it will be appreciated to apply only the second aspect processing to the first input signal, and skip the first aspect processing. However, if only the second aspect processing is applied, it will be appreciated the noise reduction processing to be tuned more aggressive by, e.g., choosing a higher level of parameter α, because of the missing contribution of the first aspect processing. Therefore, such a second aspect processing only implementation might have the drawback of a potentially higher artifact level in the resulting noise-reduced voice signal as noise reduced output signal.

Both first and second aspect processing of the described two-microphone noise reduction methods according to embodiments of the present invention rely on a microphone spacing that guarantees a considerably higher voice level in the voice microphone than in the noise microphone. If this condition is not met, distinction between voice and noise is difficult, and it will be appreciated that the signal processing might yield artifacts in the noise reduced output signal or other signal quality degradation.

Figure 4:
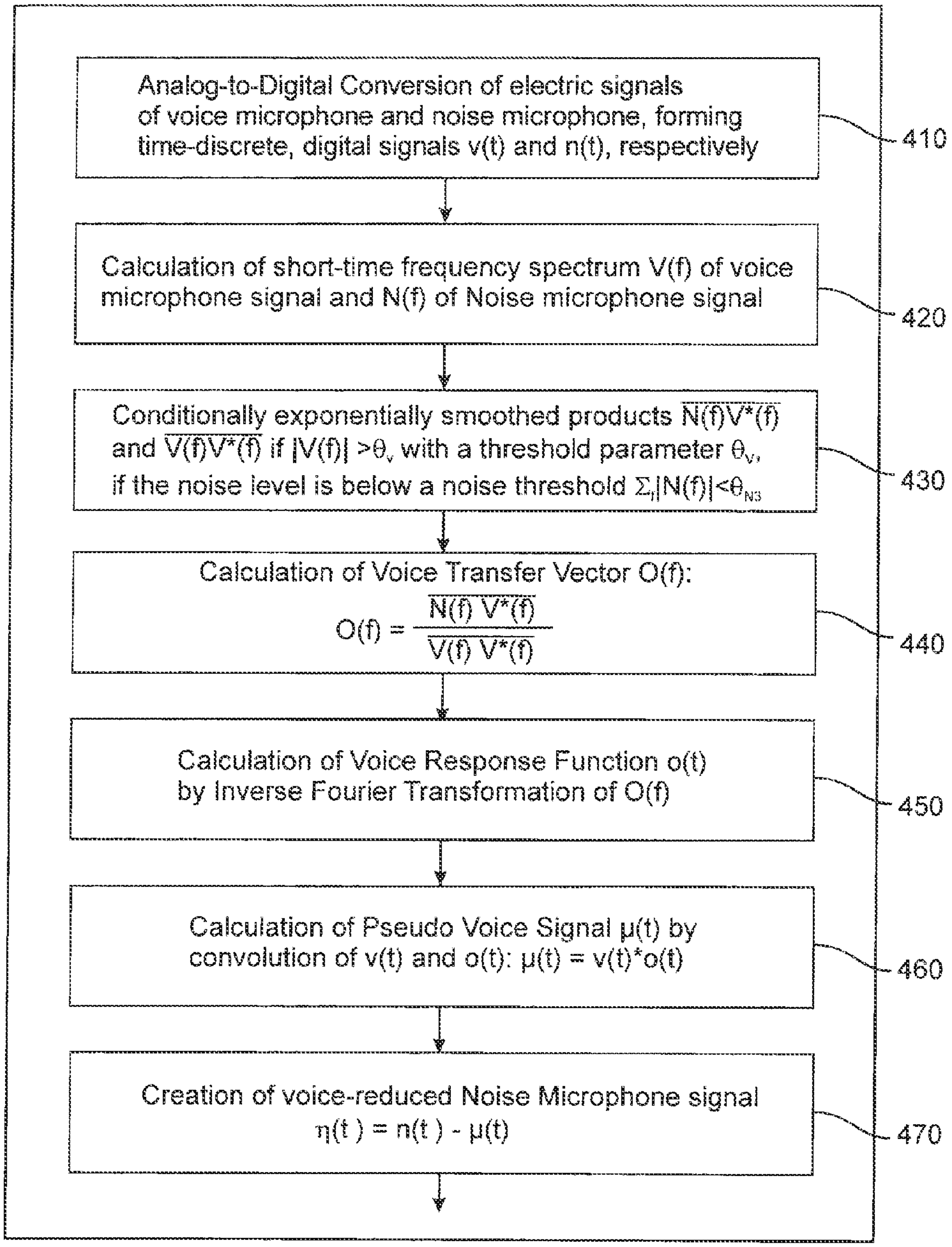
FIG. 4 shows a flow diagram illustrating a method according to an embodiment of the present invention creating a voice reduced noise signal according to a third aspect.

FIG. 4 shows a flow diagram of voice reduced microphone signal generation according to a third aspect of the invention. This aspect of the invention is appreciated in situations in which it might not always be guaranteed that there is a considerably higher voice level in the voice microphone than in the noise microphone. However, if there are time periods with an almost noise-free voice signal, the methods according to the first and the second aspects could still be applied even if the aforesaid condition is not met by further introducing the third aspect processing.

According to embodiments of the third aspect, further signal processing is introduced, which is carried out prior to the described first and/or second aspect processing in order to reduce the voice level in the noise microphone, so that the mentioned condition for the first and second aspect processing is met by means of digital signal processing, even if the raw microphone signals (first and second input signals) do not meet the condition of a sufficiently higher voice level in the voice microphone than in the noise microphone.

According to the third aspect processing a Voice Amplitude Response Function o(t) is calculated that describes the transition of the voice signal from the voice microphone to the noise microphone. The idea behind o(t) is very similar to the noise response function h(t) described earlier, but now it is the transition of the voice signal from the voice microphone to the noise microphone that is required, in order to reduce the voice signal level in the noise microphone.

Computation of o(t) is carried out by means of inverse transformation of a Voice Amplitude Transfer Function O(f) from the spectral domain into the time domain using standard methods like Inverse Fourier Transform. Calculation of O(f) requires almost noise-free speech in both Noise and Voice microphone. Under this condition, calculation of O(f) is very similar to the calculation of the Noise Amplitude Transfer Function H(f) in the above described first aspect noise reduction method. The condition of a noise free speech signal resembles the voice-free noise signal being required in the first aspect noise reduction method. In fact, the further described voice reduction of the noise microphone is to a certain extent the opposite operation of reducing the noise level of the voice microphone as described according to the first aspect noise reduction method as described with reference to FIG. 1.

According to the method of the third aspect as shown in FIG. 4, first and second input signals are generated by first and second microphones, respectively, in steps 410 and 420 which are analog to steps 210 and 220.

In step 430, conditionally exponential smoothing operations of two complex products are carried out. O(f) then results in step 440 from a division where both enumerator and denominator are again results of the exponential smoothing in step 430. As it will be appreciated and already described above with respect to e.g. the first aspect processing, components with the same frequency value f are multiplied. The argument of conditional exponential smoothing in the enumerator is the noise microphone Spectrum N(f) multiplied with the complex conjugate voice microphone V*(f). In the denominator it is the absolute square of the voice microphone Spectrum, V(f)V*(f). Exponential smoothing is only updated if the voice microphone signal energy is above a selectable threshold $\theta_V$, and the noise level is at the same time below another noise threshold $\theta_{N3}$. it will be appreciated that in connection with the third aspect processing this is an upper threshold, in contrast to all other thresholds θ so far. If said conditions are matched, exponential smoothing is carried out as already described earlier, and the Voice Amplitude Transfer Function O(f) is calculated as $$O(f) = \frac{\overline{N(f)V*(f)}}{\overline{V(f)V*(f)}}$$

By applying standard Inverse Transformation in step 450, O(f) is transformed into a Voice Response Function o(t). Using o(t) a pseudo voice signal portion μ(t) of the noise microphone signal is then calculated in step 460 by means of discrete convolution, μ(t)=v(t)*o(t). The so calculated μ(t) is then subtracted from the Noise microphone time domain signal n(t) in step 470, forming a voice-reduced noise microphone signal η(t)=n(t)−μ(t). Alternatively, pseudo voice can be generated in the spectral domain as product of spectral amplitudes of the Voice Amplitude Transfer Function O(f) and Voice microphone signal spectrum, V(f). Pseudo Voice is then subtracted from the Noise microphone signal spectrum N(f), forming a spectral representation of the voice-reduced Noise microphone signal η(t). Further processing steps in the spectral domain can then be carried out without the need of a Fourier Transformation of η(t).

According to an embodiment of the third aspect of the present invention, η(t) is then further processed as second input signal replacing the original noise microphone signal n(t) of the second microphone in the following first and/or second aspect noise reduction methods as described above. It is worth mentioning that a microphone placement that guarantees sufficient voice difference between the microphones is preferable. The third aspect processing can therefore be regarded as a workaround or processing option if said condition cannot be met for any reason, and sufficient noise-free phases are typical for the application. Such phases are required to adapt to changes in the positions of the microphones relative to the users mouth.

If said noise-free phases are not available with sufficient reliability, a calibration phase is advisable, where the Voice Amplitude Transfer Function is generated under controlled, noise-free conditions as described in the following.

According to a further embodiment, O(f) and/or o(t) is calculated only once in an initial process or at certain intervals during operation, and is as such used to calibrate the method or apparatus. It is appreciated that such an approach is reasonable if the application by its nature does not allow big variations of the position of the desired sound source (e.g. the user's mouth) relative to the microphones, e.g. as typical for an automotive application like a hands-free phone set in a vehicle, or in a video-phone hands-free situation, where the user looks at the display of a mobile device so that the position of the microphones relative to the mouth is well defined, or in a video-recording situation of a mobile device, where the mobile device is pointing to a scene being picked up be the device's internal video camera, so that also the position of the device's microphones relatively to the recorded scene is well defined.

The methods as described herein in connection with embodiments of the present invention can also be combined with a symmetric microphone approach, where then at least three microphones are used: two spaced apart symmetric microphones (voice microphones) adapted to record the speaker's voice signal, and a third asymmetric microphone (noise microphone) away from the speaker's mouth. Signal quality of both symmetric microphones is enhanced by generating noise reduced output signals for the input signals of each of the symmetric microphones, respectively, according to embodiments of the present invention. The so generated noise reduced output signals of each symmetric microphone are then further processed by applying symmetric microphone signal processing techniques as, e.g., described in German patent DE 10 2004 005 998 B3 disclosing methods for separating acoustic signals from a plurality of acoustic sound signals by two symmetric microphones. As described in German patent DE 10 2004 005 998 B3, the noise reduced output signals are then further processed by applying a filter function to their signal spectra wherein the filter function is selected so that acoustic signals from an area around a preferred angle of incidence are amplified relative to acoustic signals outside this area.

Another advantage of the described embodiments is the nature of the disclosed inventive methods, which smoothly allow sharing processing resources with another important feature of telephone handsets, namely so called Acoustic Echo Cancelling as described, e.g., in German patent DE 100 43 064 B4. This German patent describes a technique using a filter system which is designed to remove loudspeaker-generated sound signals from a microphone signal. This technique is applied if the handset or the like is used in a hands-free mode instead of the standard handset mode. In hands-free mode, the telephone is operated in a bigger distance from the mouth, and the information of the Noise microphone is less useful. Instead, there is knowledge about the source signal of another disturbance, which is the signal of the handset loudspeaker. This disturbance must me removed from the Voice microphone signal by means of Acoustic Echo Cancelling. Because of synergy effects between the embodiments of the present invention and Acoustic Echo Cancelling, the complete set of required signal processing components can be implemented very resource-efficient, i.e. being used for carrying out the embodiments described therein as well as the Acoustic Echo Cancelling, and thus with low memory- and power-consumption of the overall apparatus leading to low energy consumption, which increases battery life times of such portable devices. Since saving energy is an important aspect of modern electronics ("green IT") this synergy further improves consumer acceptance and functionality of handsets or alike combining embodiments of the presents invention with Acoustic Echo Cancelling techniques as, e.g., referred to in DE 100 43 064 B4.

Apparatus according to an embodiment can not only be implemented in a telephone handset but in a hands-free phone set in a vehicle or the like as well. Since in normal operation mode of a handset, the user's mouth is expected to be close the voice microphone and the noise microphone is preferably arranged at the far side of the user's mouth, the microphones of such a handset can be implemented as having an omni-directional characteristic for recording acoustic sound signals since due to the ambient noise situation is can be assumed that the voice microphone will record a higher noise signal level of the user's speech than the noise microphone. In the embodiment of the hands-free phone set in a vehicle the situation is different. Both noise and voice microphones are not necessarily situated that the voice microphone is near side of the user's mouth and the noise microphone is back side of the user's mouth so that the condition by which a considerably higher voice level is received in the voice microphone than in the noise microphone can not be guaranteed by using microphones with omni-directional characteristic. According to an embodiment of the hands-free phone set at least the voice microphone and preferably both the voice and the noise microphone are therefore implemented as having a directional characteristic with a directional pattern directed to the assumed position of the user's mouth for the voice microphone and a directional pattern not directed to the user's mouth for the noise microphone. With such a microphone implementation providing user's speech sound discrimination between the voice and the noise microphone inside of a vehicle, a considerable ambient noise signal level reduction has been achieved in hands-free phone sets by applying methods according to the invention.

It will be readily apparent to the skilled person that the methods, the elements, units and apparatuses described in connection with embodiments of the invention may be implemented in hardware, in software, or as a combination thereof. Embodiments of the invention and the elements of modules described in connection therewith may be implemented by a computer program or computer programs running on a computer or being executed by a microprocessor, DSP (digital signal processor), or the like. Computer program products according to embodiments of the present invention may take the form of any storage medium, data carrier, memory or the like suitable to store a computer program or computer programs comprising code portions for carrying out embodiments of the invention when being executed. Any apparatus implementing the invention may in particular take the form of a computer, DSP system, hands-free phone set in a vehicle or the like, or a mobile device such as a telephone handset, mobile phone, a smart phone, a PDA, or anything alike.

What is claimed is:

1. A method for generating a noise reduced output signal from sound received by a first microphone, said method comprising:

transforming said sound received by said first microphone into a first input signal, wherein said first input signal is a frequency domain signal of an analog-to-digital converted audio signal corresponding to said sound received by said first microphone;

transforming sound received by a second microphone, said second microphone being spaced apart from said first microphone, into a second input signal, wherein said second input signal is a frequency domain signal of an analog-to-digital converted audio signal corresponding to the sound received by said second microphone;

calculating, for each of a plurality of frequency components, an energy transfer function value as a real-valued quotient by dividing a temporally averaged product of an amplitude of said first input signal and said second input signal by a temporally averaged absolute square of said second input signal, wherein said temporal averaging of said product and said temporal averaging of said absolute square are subject to a first update condition;

calculating, for each of said plurality of frequency components, a gain value as a function of said calculated energy transfer function value; and generating said noise reduced output signal based on a product of said first input signal and said calculated gain value at each of said plurality of frequency components.

2. The method according to claim 1, wherein said temporal averaging of said product and said temporal averaging of said absolute square are updated for each frequency component, of said plurality of frequency components, when said second input signal has a higher signal level than said first input signal, or said temporal averaging of said product and said temporal averaging of said absolute square are updated for at least one frequency component, of said plurality of frequency components, when said second input signal has a higher signal level than said first input signal for said at least one frequency component.

3. The method according to claim 1, wherein said gain value is calculated, for each of said plurality of frequency components, as a monotonously falling function, and said monotonously falling function includes an argument based on said energy transfer function value multiplied by an absolute spectral amplitude value of said second input signal divided by an absolute spectral amplitude value of said first input signal.

4. The method according to claim 1, wherein said gain value is calculated, for each of said plurality of frequency components, in a way that said gain value does not exceed 1 and said gain value is set to a predetermined minimal value if said calculated gain value is smaller than said predetermined minimal value.

5. The method according to claim 1, wherein generating said noise reduced output signal comprises transforming said product at all frequency components into a discrete time domain noise reduced output signal.

6. A method for generating a noise reduced output signal from sound received by a first microphone, said method comprising:

transforming said sound received by said first microphone into a first input signal, wherein said first input signal is a frequency domain signal of an analog-to-digital converted audio signal corresponding to said sound received by said first microphone;

transforming sound received by a second microphone, said second microphone being spaced apart from said first microphone, into a second input signal, wherein said second input signal is a frequency domain signal of an analog-to-digital converted audio signal corresponding to the sound received by said second microphone;

generating a pre-processed first input signal by subtracting a pseudo noise signal based on said second input signal from said first input signal;

calculating, for each of a plurality of frequency components, an energy transfer function value as a real-valued quotient by dividing a temporally averaged product of an amplitude of said pre-processed first input signal and said second input signal by a temporally averaged absolute square of said second input signal, wherein said temporal averaging of said product and said temporal averaging of said absolute square are subject to a first update condition;

calculating, for each of said plurality of frequency components, a gain value as a function of said calculated energy transfer function value; and generating said noise reduced output signal based on a product of said pre-processed first input signal and said calculated gain value at each of said plurality of frequency components.

7. The method according to claim 6, wherein generating said pre-processed first input signal further comprises:

calculating, for each frequency component, a noise amplitude transfer function value as a complex-valued quotient obtained by dividing a temporally averaged product of said first input signal and a complex conjugate of said second input signal by said temporally averaged absolute square of said second input signal, wherein said temporal averaging of said product of said first input signal and said complex conjugate, and said temporal averaging of said absolute square of said second input signal are subject to a second update condition;

calculating said pseudo noise signal based on said second input signal and the calculated noise amplitude transfer function; and calculating said pre-processed first input signal by subtracting said calculated pseudo noise signal from said first input signal, wherein said temporal averaging of said absolute square of said second update condition is updated for at least one frequency component, of said plurality of frequency components when said second input signal has a higher signal level than said first input signal for said at least one frequency component.

8. The method according to claim 7, wherein said pseudo noise signal is calculated by a discrete convolution of a time domain signal of said second input signal with a noise response function transformed from said calculated complex-valued noise amplitude transfer function into a time domain.

9. The method according to claim 6, further comprising:

generating a pre-processed second input signal by subtracting a pseudo voice signal based on said first input signal from said second input signal before generating said pre-processed first input signal; and substituting said second input signal with said pre-processed second input signal when calculating said energy transfer function value, calculating said gain value, and generating said noise reduced output signal.

10. A method for generating a noise reduced output signal from sound received by a first microphone, said method comprising:

transforming said sound received by said first microphone into a first input signal, wherein said first input signal is a frequency domain signal of an analog-to-digital converted audio signal corresponding to said sound received by said first microphone;

transforming sound received by a second microphone, said second microphone being spaced apart from said first microphone, into a second input signal, wherein said second input signal is a frequency domain signal of an analog-to-digital converted audio signal corresponding to the sound received by said second microphone;

generating a pre-processed second input signal by subtracting a pseudo voice signal based on said first input signal from said second input signal;

calculating, for each of a plurality of frequency components, an energy transfer function value as a real-valued quotient by dividing a temporally averaged product of an amplitude of said first input signal and said pre-processed second input signal by a temporally averaged absolute square of said pre-processed second input signal, wherein said temporal averaging of said product and said temporal averaging of said absolute square are subject to a first update condition;

calculating, for each of said plurality of frequency components, a gain value as a function of said calculated energy transfer function value; and generating said noise reduced output signal based on a product of said first input signal and said calculated gain value at each of said plurality of frequency components.

11. The method according to claim 10, wherein generating said pre-processed second input signal further comprises:

calculating, for each frequency component of the plurality of frequency components, a voice amplitude transfer function value as a complex-valued quotient obtained by dividing a temporally averaged product of said second input signal and a complex conjugate of said first input signal by a temporally averaged absolute square of said first input signal, wherein said temporal averaging of said product of said second input signal and said temporal averaging of said averaged absolute square of said first input signal is subject to a third update condition;

calculating said pseudo voice signal based on said first input signal and said calculated voice amplitude transfer function; and calculating said pre-processed second input signal by subtracting said calculated pseudo voice signal from said second input signal, wherein said temporal averaging with said third update condition is updated for each frequency component, of the plurality of frequency components, when said first input signal has a higher signal level than said second input signal, or said temporal averaging with said third update condition is updated for at least one frequency component, of said plurality of frequency components, when said first input signal has a higher signal level than said second input signal for said at least one frequency component.

12. The method according to claim 11, wherein said pseudo voice signal is calculated by discrete convolution of a time domain signal of said first input signal with a voice response function transformed from said calculated voice amplitude transfer function into a time domain.

13. An apparatus for generating a noise reduced output signal from sound received by a first microphone, the apparatus comprising:

said first microphone to transform sound received by said first microphone into a first input signal, wherein said first input signal is a frequency domain signal of an analog-to-digital converted audio signal corresponding to said sound received by said first microphone;

a second microphone to transform sound received by said second microphone, said second microphone being spaced apart from said first microphone, into a second input signal, wherein said second input signal is a frequency domain signal of an analog-to-digital converted audio signal corresponding to said sound received by said second microphone; and a processor to calculate, for each frequency component, an energy transfer function value as a real-valued quotient obtained by dividing a temporally averaged product of an amplitude of said first input signal and an amplitude of said second input signal by a temporally averaged absolute square of said second input signal, wherein said temporal averaging of the product of said amplitude of said first input signal and said amplitude of said second input signal, and said temporal averaging of said absolute square of said second input signal is subject to a first update condition, a gain value which is a function of said calculated energy transfer function value, and a noise reduced output signal based on a product of said first input signal and said gain value at each frequency component.

14. The apparatus of claim 13, wherein said processor is further to:

update said temporal averaging of the product of said amplitude of said first input signal and said amplitude of said second input signal and said temporal averaging of said absolute square of said second input signal for each frequency component when said second input signal has a higher signal level than said first input signal.

15. The apparatus of claim 13, wherein said processor is further to:

update said temporal averaging of the product of said amplitude of said first input signal and said amplitude of said second input signal and said temporal averaging of said absolute square of said second input signal for at least one frequency component when said second input signal has a higher signal level than the at least one frequency component.

16. The apparatus of claim 13, wherein said processor is further to:

calculate said gain value for each frequency component as a monotonously falling function, said monotonously falling function including an argument that is based on said energy transfer function value multiplied by an absolute spectral amplitude value of said second input signal divided by an absolute spectral amplitude value of said first input signal.

17. A non-transitory computer-readable storage medium comprising:

one or more instructions which, when executed by at least one processor, cause the at least one processor to:

transform sound received by a first microphone into a first input signal, wherein said first input signal is a frequency domain signal of an analog-to-digital converted audio signal corresponding to said sound received by said first microphone;

transform sound received by a second microphone into a second input signal, said second microphone being spaced apart from said first microphone and wherein said second input signal is a frequency domain signal of an analog-to-digital converted audio signal corresponding to the sound received by said second microphone;

calculate, for each of a plurality of frequency components, an energy transfer function value as a real-valued quotient by dividing a temporally averaged product of an amplitude of said first input signal and said second input signal by a temporally averaged absolute square of said second input signal, wherein said temporal averaging of said product and said temporal averaging of said absolute square are subject to a first update condition;

calculate, for each of said plurality of frequency components, a gain value as a function of said calculated energy transfer function value; and generate a noise reduced output signal based on a product of said first input signal and said calculated gain value at each of said plurality of frequency components.

18. The medium of claim 17, further comprising:

one or more instructions to update said temporal averaging of the product of said amplitude of said first input signal and said amplitude of said second input signal and said temporal averaging of said absolute square of said second input signal for each frequency component when said second input signal has a higher signal level than said first input signal.

19. The medium of claim 17, further comprising:

one or more instructions to update said temporal averaging of the product of said amplitude of said first input signal and said amplitude of said second input signal and said temporal averaging of said absolute square of said second input signal for at least one frequency component when said second input signal has a higher signal level than the at least one frequency component.

20. The medium of claim 17, further comprising:

one or more instructions to calculate said gain value for each frequency component as a monotonously falling function, said monotonously falling function including an argument that is based on said energy transfer function value multiplied by an absolute spectral amplitude value of said second input signal divided by an absolute spectral amplitude value of said first input signal.

21. The method of claim 7, wherein said temporal averaging of said absolute square of said second update condition is updated for each frequency component, of said plurality of frequency components when said second input signal has a higher signal level than said first input signal.

* * * * *